United States Patent Office 2,867,499
Patented Jan. 6, 1959

2,867,499

CONVERSION OF SODIUM TETRACHLOROALUMINATE TO SODIUM ALUMINUM HYDRIDE

Carl D. Good, Niagara Falls, and Howard D. Batha, Grand Island, N. Y., assignors, by mesne assignments, to Olin Mathieson Chemical Corporation, a corporation of Virginia No Drawing. Application March 22, 1956
Serial No. 573,301

3 Claims. (Cl. 23—14)

This invention relates to a process for the preparation of sodium aluminum hydride and, in particular, to the preparation of sodium aluminum hydride from sodium tetrachloroaluminate.

In the manufacture of diborane by the reaction of sodium hydride, boron trichloride and aluminum chloride in the presence of an aromatic solvent such as benzene, which is disclosed in application Serial No. 507,734, filed May 10, 1955, in the name of Carl D. Good, the compound sodium tetrachloroaluminate is formed as shown in the following equation:

$$6NaH + 2BCl_3 + 6AlCl_3 \xrightarrow{benzene} B_2H_6 + 6NaAlCl_4$$

There is a need in the art for a method whereby the sodium tetrachloroaluminate can be converted into a more useful product, inasmuch as at present sodium tetrachloroaluminate constitutes a waste material. The present invention provides a method whereby sodium tetrachloroaluminate can be converted to sodium aluminum hydride. This is accomplished by reacting the sodium tetrachloroaluminate with a lower dialkyl ether containing not more than 3 carbon atoms in each alkyl radical, thereby forming a 1 : 1 complex or addition product of aluminum chloride and the ether. This complex is then reacted with sodium hydride, resulting in the formation of sodium aluminum hydride.

Sodium aluminum hydride can be advantageously used as a replacement for the extremely expensive lithium aluminum hydride which finds application in a wide variety of operations. A major disadvantage in the use of lithium aluminum hydride is the high cost of this material. This high cost stems from the fact that lithium aluminum hydride is formed from lithium hydride, the hydride of a metal which is not found widely distributed in nature and is therefore expensive. Hence, it would be desirable to have available a material such as sodium aluminum hydride which may be prepared from sodium hydride and which, in turn, may be manufactured from sodium, a metal in plentiful supply at reasonable cost. Moreover, sodium aluminum hydride is a valuable material for the preparation of diborane as disclosed in application Serial No. 544,593, filed November 2, 1955, in the name of James B. Vetrano.

*Example I*

Sodium tetrachloroaluminate was obtained in the following manner: To a 500 ml. reaction flask which was fitted with a thermowell and high speed stirrer there was added first 0.195 ml. of dry sodium hydride and 30 g. of reagent grade aluminum chloride. The flask was connected to a long, spiral condenser, the outlet of which led to a series of four traps all maintained at a temperature of −196° C. The spiral condenser was cooled with methanol which had been passed through a Dry-Ice-acetone slush. A nitrogen atmosphere was maintained in the reaction flask throughout the experiment. In the next step 300 ml. of benzene which had been previously dried over sodium hydride was added to the flask and the mixture was slurried by means of the high speed stirrer for 15 minutes. Gaseous boron trichloride, which had been previously purified by distillation through a Piros-Glover column, was passed through a calibrated rotameter, admixed with nitrogen, and the two gases admitted into a reaction flask at a point beneath the slurry level. Over a period of 90 minutes 0.0562 mole of gaseous boron trichloride was added while the reaction temperature was maintained below 49.2° C. After the addition of the boron trichloride had been completed the temperature of the reaction mixture was raised to 79.5° C. by heating with an external electric heater. Then the mixture was subjected to a purge of nitrogen for 45 minutes and the products collected in the traps maintained at −196° C. The products were degassed by maintaining them at an absolute pressure of about 0.5 mm. of Hg for 5 minutes and then fractionated by passing the gaseous products through a trap maintained at −130° C. The products volatile at −130° C. were measured in a calibrated portion of the vacuum line and a portion of this gas was submitted for infrared analysis. A total of 0.341 moles of gas was measured and infrared analysis indicated that the gas was 86.6 percent diborane. On this basis of the sodium hydride present and on the equation for the reaction:

$$6NaH + 2BCl_3 + 6AlCl_3 \rightarrow B_2H_6 + 6NaAlCl_4$$

the yield of diborane was 84 per cent.

The solid residue produced in the diborane reaction, largely sodium tetrachloroaluminate, was removed from the benzene by filtration and dried under vacuum. By analysis it was shown that this residue contained 12.20 weight percent sodium, 16.2 weight percent aluminum and 65.6 weight percent chlorine (calculated for sodium tetrachloroaluminate; 11.98 weight percent sodium, 14.07 weight percent aluminum and 74 weight percent chlorine). Upon hydrolysis a 1 g. sample of this residue produced 0.007 g. of hydrogen. A 16.4074 g. sample of the residue was placed in a Soxhlet thimble and extracted with 250 ml. of diethyl ether for a period of about 16 hours. By vacuum distillation the excess ether was removed and a sample of the residue submitted for analysis. Analysis of the dry residue indicated that it contained 4.40 weight percent hydrogen, 21.04 weight percent carbon, 11.36 weight percent aluminum and 41.53 weight percent chlorine. These results indicate that the dry residue was a somewhat impure diethyl ether-aluminum chloride complex in a 1 : 1 molar ratio. The theoretical composition of such a 1:1 complex would be: aluminum, 13.02 weight percent, chlorine, 51.3 weight percent; carbon, 23.10 weight percent; hydrogen, 4.81 weight percent and oxygen, 7.70 weight percent. During the extraction operation a total of 10.2625 g. of aluminum chloride was extracted from the original 16.4074 g. sample of the residue.

In the next step a 12.7 g. sample of the diethyl ether-aluminum chloride obtained as described previously was diluted with 50 ml. diethyl ether. This solution was added drop-wise, with stirring, over a period of 24 minutes to a slurry of 31.6 g. of sodium hydride-oil suspension (23.3 weight percent NaH and 76.7 weight percent oil) in 150 ml. of tetrahydrofuran while the temperature of the flask was maintained by external heating at a temperature of 67–58° C. After the diethyl ether-aluminum chloride had all been added, heating and stirring was continued for an additional 30 minutes period.

The resulting reaction mixture was filtered to remove sodium chloride and the residue washed with additional 100 cc. of tetrahydrofuran. By active hydrogen determination on the solution it was shown that the yield of sodium aluminum hydride was 40.2 percent.

By vacuum evaporation the tetrahydrofuran was removed from the filtrate leaving a slurry of sodium aluminum hydride in the oil which was originally added with the sodium hydride. The slurry was washed with one 50 ml. portion and two 25 ml. portions of toluene, the toluene being removed from the solid sodium aluminum hydride by decantation after each portion had been added. The solid sodium aluminum hydride, wet with toluene, was subjected to a second vacuum evaporation in order to remove the toluene. Analysis of the resulting white powder which still contained some toluene showed that the ratio of aluminum to sodium was 1.31 as compared to the calculated value for sodium aluminum hydride of 1.17. Likewise, it was shown that the ratio of aluminum to hydrogen was 6.52 as compared to the calculated value of 6.75. By additional vacuum drying pure white sodium aluminum hydride can be obtained.

Various modifications can be made in the procedures of the specific examples to provide other embodiments which fall within the scope of this invention. Thus, in place of the diethyl ether utilized, there can be substituted other lower dialkyl ethers containing not more than 3 carbon atoms in each alkyl radical, such as dimethyl ether, methyl ethyl ether, di-n-propyl ether, diisopropyl ether and the like. In reacting the sodium tetrachloroaluminate and the ether, at least one mole of the ether per mole of sodium tetrachloroaluminate should be used, and preferably the molar ratio of ether to said sodium tetrachloroaluminate employed is within the range from 1.0 to 30.0. As the specific example illustrates the complex is advantageously formed by refluxing the ether and washing the sodium tetrachloroaluminate with condensed ether vapors. It is not essential that this precise procedure be employed, however, and in general the sodium tetrachloroaluminate and dialkyl ether can be reacted by contacting it as a temperature within the range from about 0° C. to about 100° C., pressure being utilized as necessary to maintain the ether in liquid phase.

In reacting the aluminum chloride-dialkyl ether complex with sodium hydride to form the sodium aluminum hydride, the ratio of the moles of sodium hydride to the moles of complex can be varied widely, generally being within the range from about 4 to about 25 moles of sodium hydride per mole of complex. The temperature at which the reaction between the sodium hydride and the complex is carried out can also be varied widely, generally being from 45° C. to 80° C., with the preferred temperature range being from 55° C. to 75° C. The reaction between the sodium hydride and the complex can be carried out in any solid which is inert under the reaction conditions and which at the same time is a good solvent for sodium aluminum hydride but not for sodium chloride. Among the solvents which are suitable, in addition to the tetrahydrofuran employed in the specific example, are dialkyl ethers conforming to the general formula:

$$RO(CH_2CH_2O)_nR'$$

wherein R and R' are alkyl radicals containing not more than 2 carbon atoms and wherein $n$ is an integer from 1 to 4, for example, the dimethyl ether of monoethylene glycol, the dimethyl ether of diethylene glycol, the dimethyl ether of triethylene glycol, and the corresponding diethyl ethers.

We claim:

1. A method for the conversion of sodium tetrachloroaluminate to sodium aluminum hydride which comprises recting the sodium tetrachloroaluminate with a lower dialkyl ether containing not more than 3 carbon atoms in each alkyl radical, the ether being maintained in liquid phase, to form an addition product of aluminum chloride and the lower dialkyl ether and thereafter reacting said addition product with sodium hydride to form sodium aluminum hydride.

2. The method of claim 1 wherein said lower dialkyl ether is diethyl ether.

3. A method for the conversion of sodium tetrachloroaluminate to sodium aluminum hydride which comprises reacting from 1.0 to 30.0 moles of diethyl ether in admixture with each one mole of sodium tetrachloroaluminate at a temperature within the range from about 0° C. to about 100° C., the ether being maintained in liquid phase, to form an addition product of diethyl ether and aluminum chloride, and thereafter reacting said addition product in admixture with from about 4 to about 25 moles of sodium hydride per mole of said addition product at a temperature within the range from 45° C. to 80° C. to form sodium aluminum hydride.

References Cited in the file of this patent

UNITED STATES PATENTS

| 2,544,472 | Schlesinger et al. | Mar. 6, 1951 |
| 2,576,311 | Schlesinger et al. | Nov. 27, 1951 |